(12) United States Patent
Jang et al.

(10) Patent No.: US 11,528,416 B2
(45) Date of Patent: Dec. 13, 2022

(54) CAMERA DEVICE HAVING SHIFTABLE OPTICAL PATH

(71) Applicant: LG INNOTEK CO., LTD., Seoul (KR)

(72) Inventors: Seong Ha Jang, Seoul (KR); Ju Un Park, Seoul (KR); Yang Hyun Joo, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 17/278,041

(22) PCT Filed: Sep. 27, 2019

(86) PCT No.: PCT/KR2019/012548
§ 371 (c)(1),
(2) Date: Mar. 19, 2021

(87) PCT Pub. No.: WO2020/067745
PCT Pub. Date: Apr. 2, 2020

(65) Prior Publication Data
US 2021/0385380 A1 Dec. 9, 2021

(30) Foreign Application Priority Data
Sep. 28, 2018 (KR) .................. 10-2018-0116463

(51) Int. Cl.
*H04N 5/232* (2006.01)
*G02B 27/64* (2006.01)
(Continued)

(52) U.S. Cl.
CPC ....... *H04N 5/23248* (2013.01); *G02B 27/646* (2013.01); *G03B 3/12* (2013.01);
(Continued)

(58) Field of Classification Search
CPC ............. H04N 5/23229; H04N 5/2253; H04N 5/2254; G02B 3/14; G02B 27/646; G03B 3/12
See application file for complete search history.

(56) References Cited

U.S. PATENT DOCUMENTS 9,325,973 B1 4/2016 Hazeghi et al.
9,392,152 B2 7/2016 Kim
(Continued)

FOREIGN PATENT DOCUMENTS

| JP | 2009-47852 A | 3/2009 |
| KR | 10-2013-0088803 A | 8/2013 |
| KR | 10-1629610 B1 | 6/2016 |

*Primary Examiner* — Nicholas G Giles
(74) *Attorney, Agent, or Firm* — Birch, Stewart, Kolasch & Birch, LLP

(57) ABSTRACT

A camera device according to an embodiment of the present invention includes a light output unit that outputs an output light signal to be irradiated to an object, a lens unit that condenses an input light signal reflected from the object, an image sensor that generates an electric signal from the input light signal condensed by the lens unit and an image processing unit that extracts a depth map of the object using at least one of a time difference and a phase difference between the output light signal and the input light signal received by the image sensor, the lens unit including IR (InfraRed) filter, a plurality of solid lenses disposed on the IR filter and a liquid lens disposed on the plurality of solid lenses, or disposed between the plurality of solid lenses, the camera device further including a first driving unit that controls shifting of the IR filter or the image sensor and a second driving unit that controls a curvature of the liquid lens, an optical path of the input light signal being repeatedly shifted according to a predetermined rule by one of the first driving unit and the second driving unit, and the optical path of the input light signal being shifted according to prede- (Continued)

termined control information by the other one of the first driving unit and the second driving unit.

20 Claims, 18 Drawing Sheets

(51) Int. Cl.
*G03B 3/12* (2021.01)
*G02B 3/14* (2006.01)
*H04N 5/225* (2006.01)

(52) U.S. Cl.
CPC ............ *H04N 5/23229* (2013.01); *G02B 3/14* (2013.01); *H04N 5/2253* (2013.01); *H04N 5/2254* (2013.01)

(56) References Cited

U.S. PATENT DOCUMENTS

| | | | |
|---|---|---|---|
| 2005/0280714 A1 | 12/2005 | Freeman | |
| 2009/0052000 A1 | 2/2009 | Sakata | |
| 2009/0160956 A1* | 6/2009 | Yumiki | H04N 5/23258 348/208.11 |
| 2014/0125825 A1 | 5/2014 | Baer et al. | |
| 2016/0212332 A1 | 7/2016 | Tang et al. | |
| 2019/0230288 A1* | 7/2019 | Tsuchiya | H04N 5/23287 |

* cited by examiner

[FIG. 1]
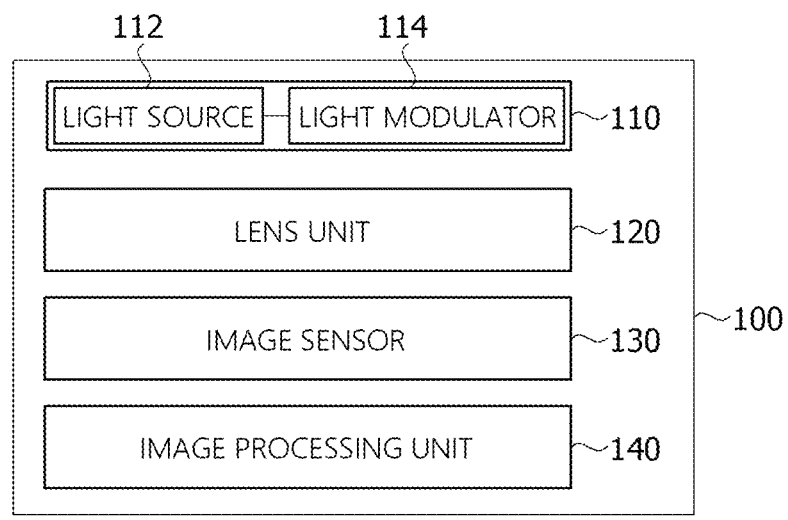

[FIG. 2]
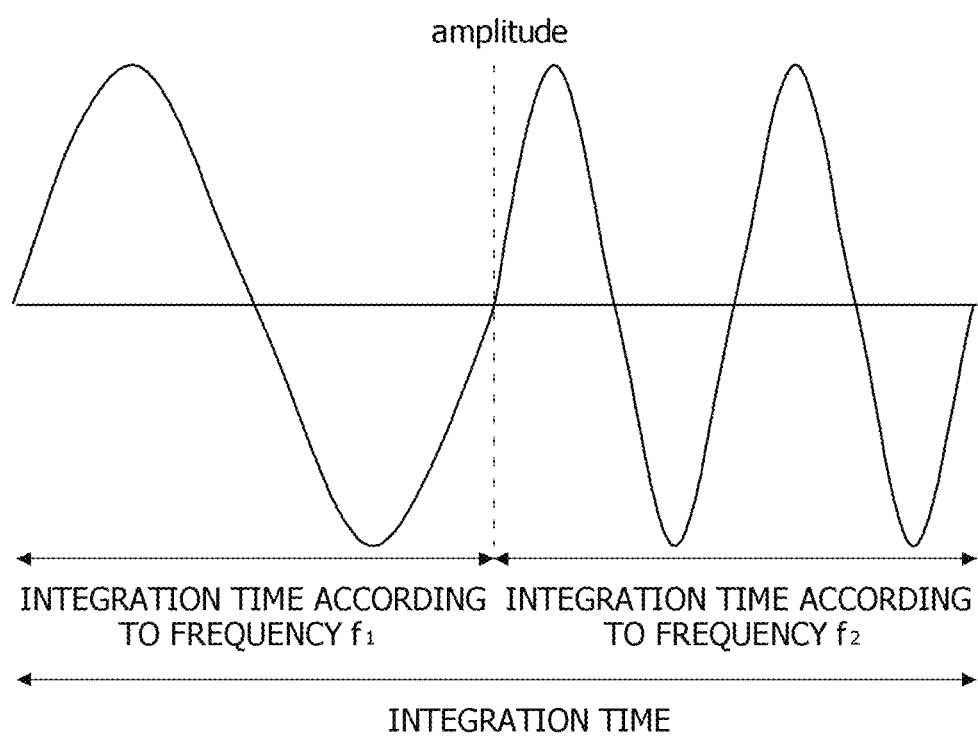

[FIG. 3]
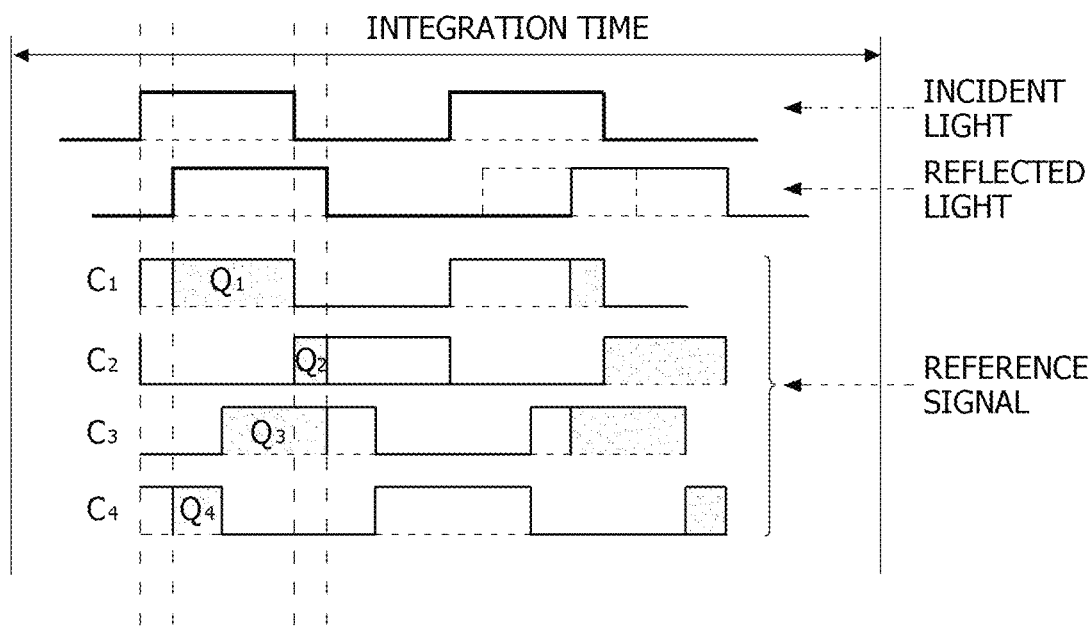

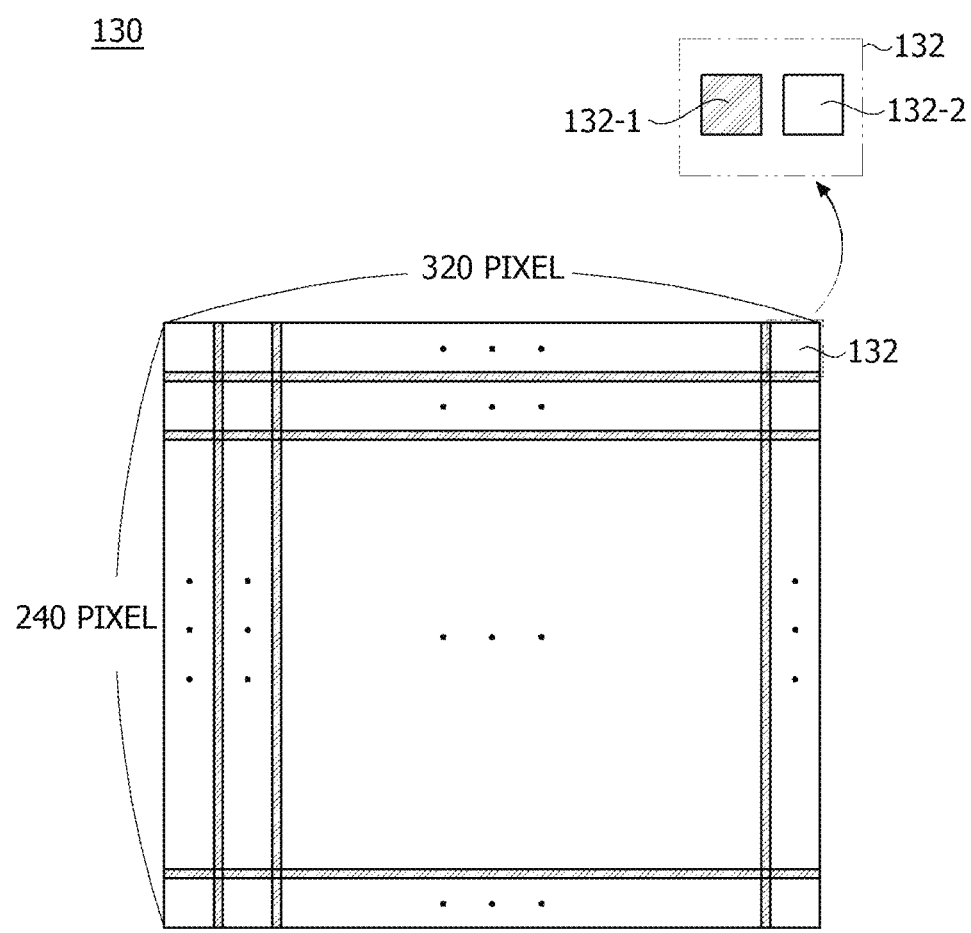
[FIG. 4]

[FIG. 5]
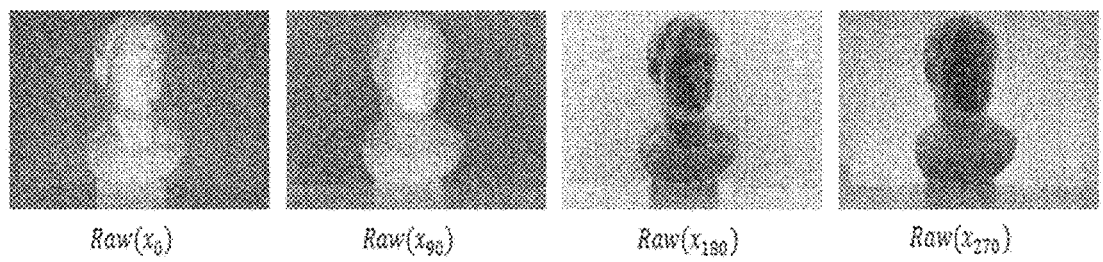
[FIG. 6]

[FIG. 7]
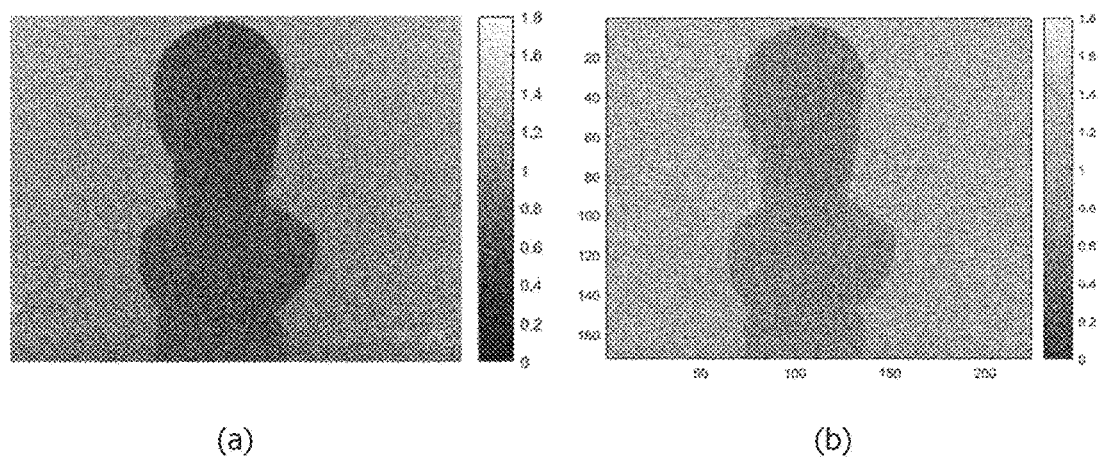
(a)           (b)

[FIG. 8]
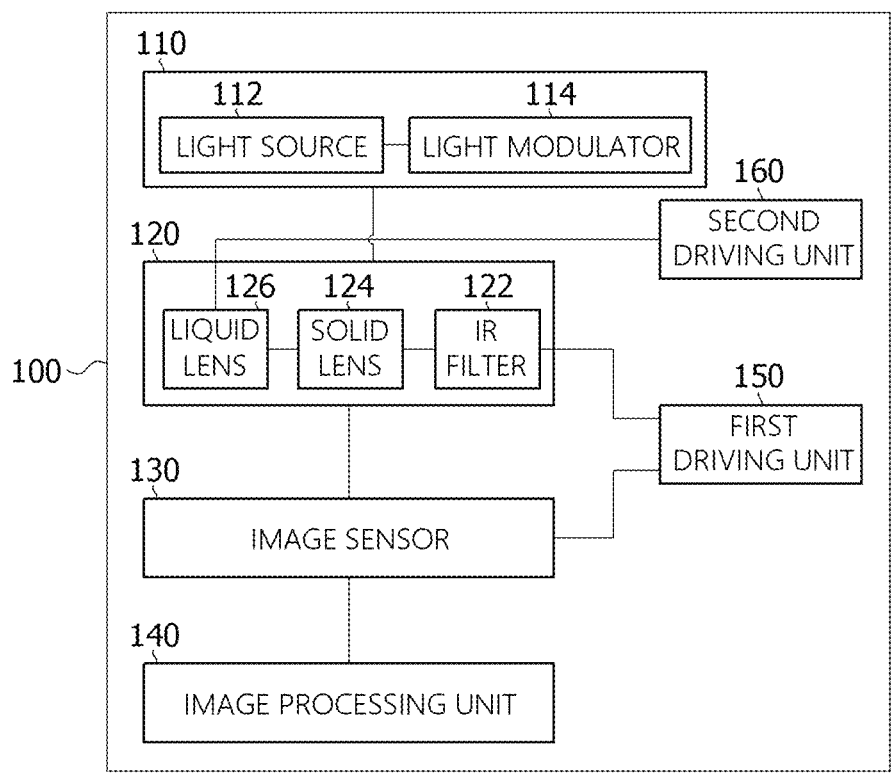

[FIG. 9]
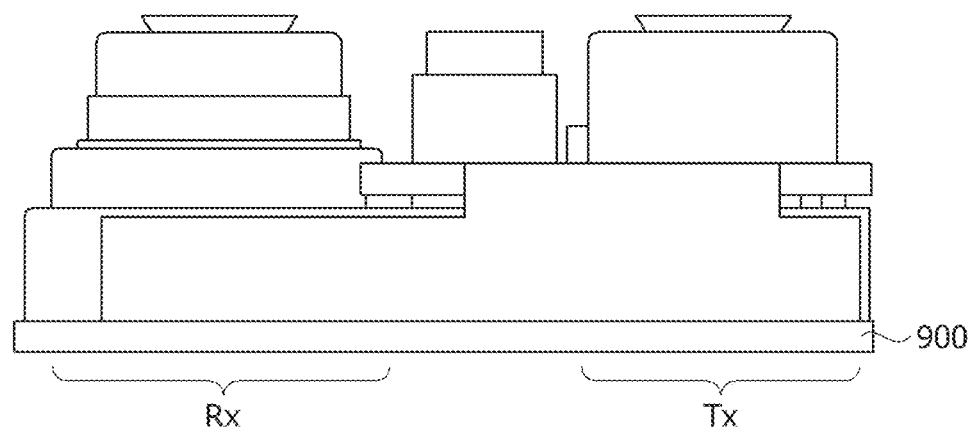

[FIG. 10]
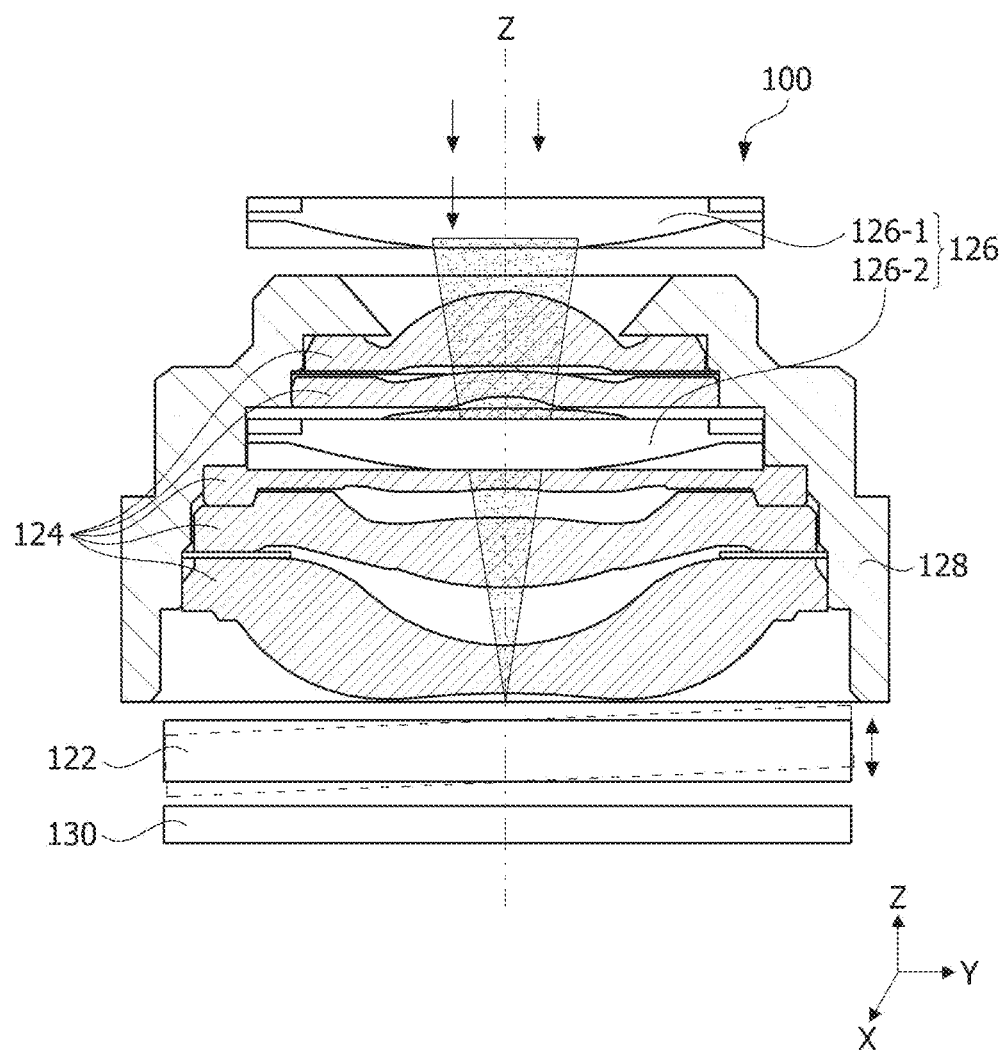

[FIG. 11]
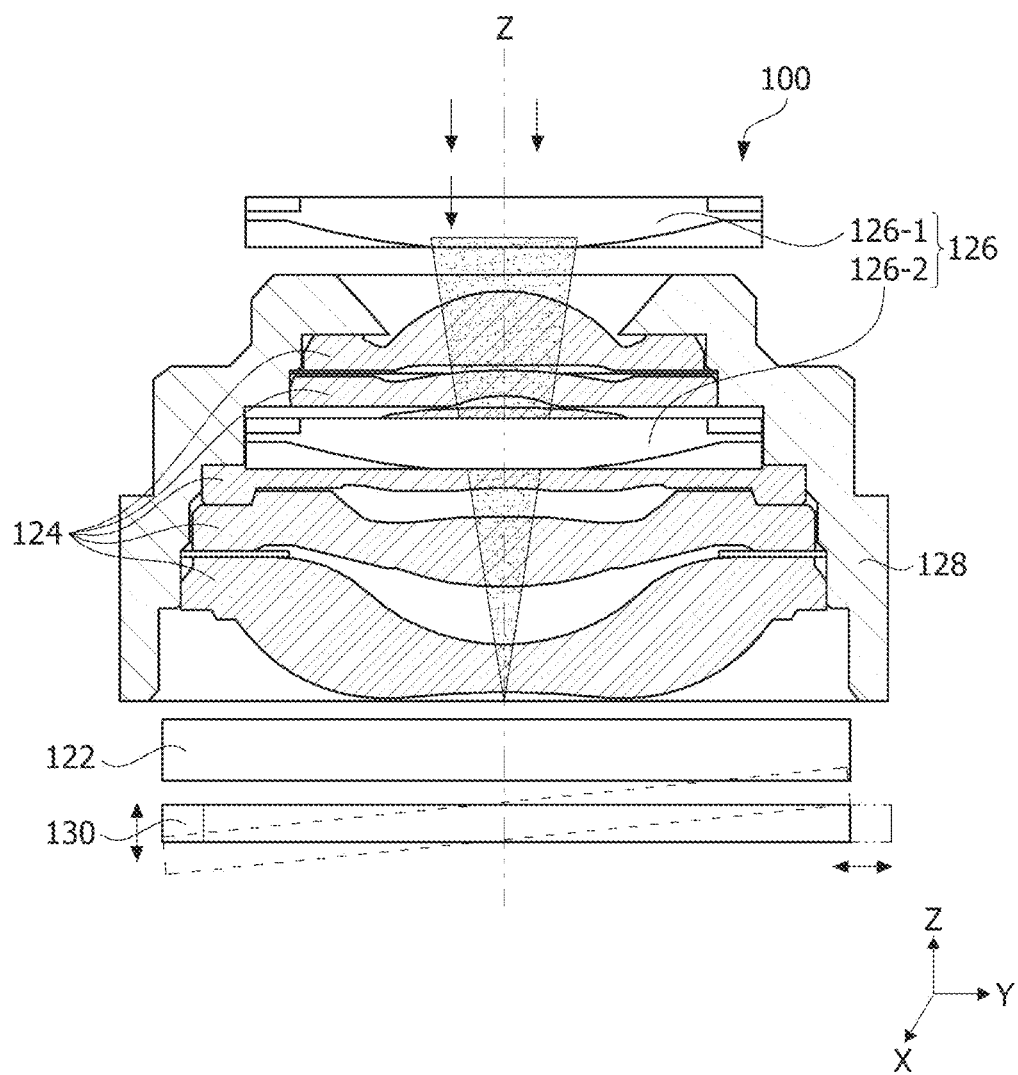

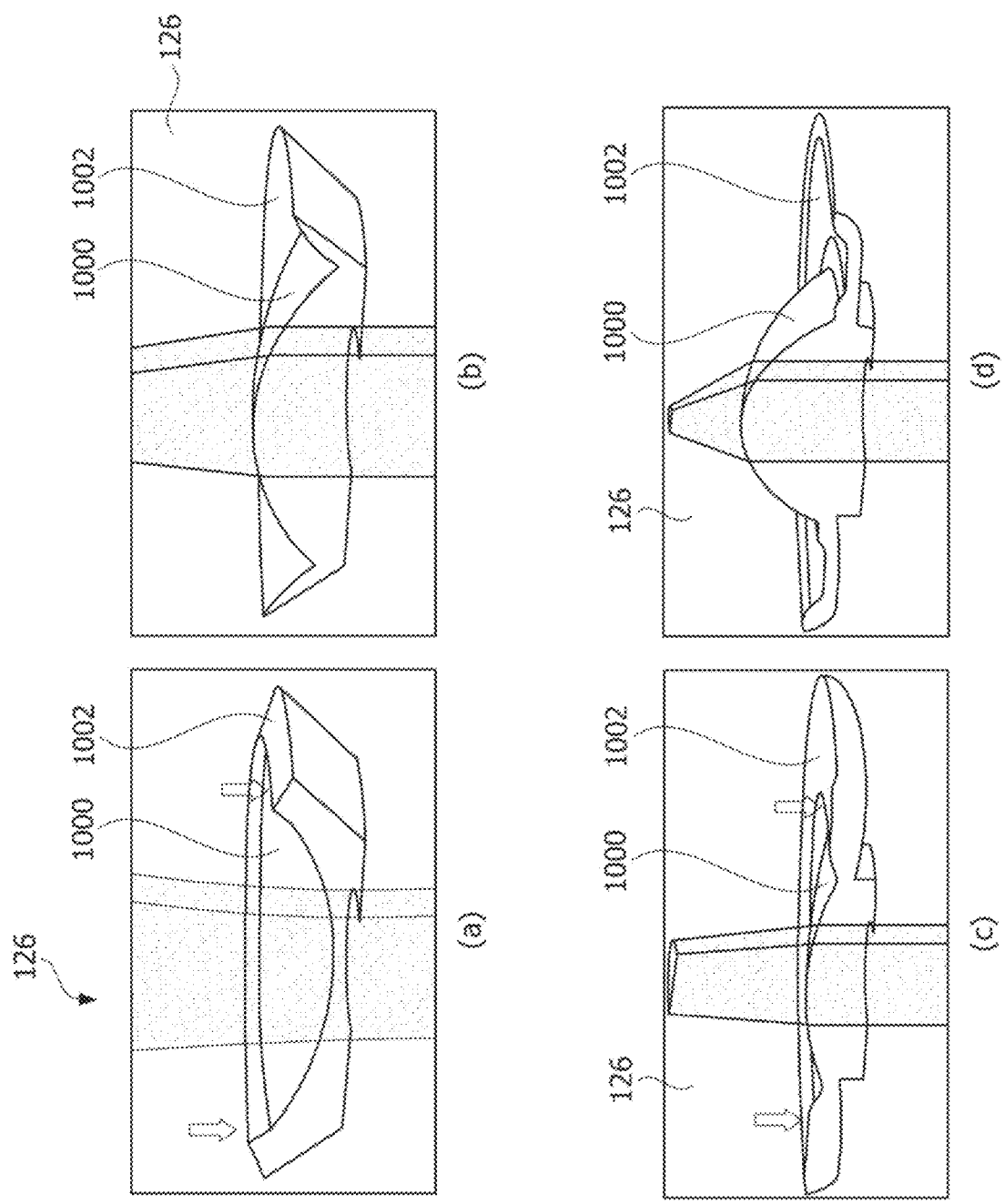
[FIG. 12]

[FIG. 13]
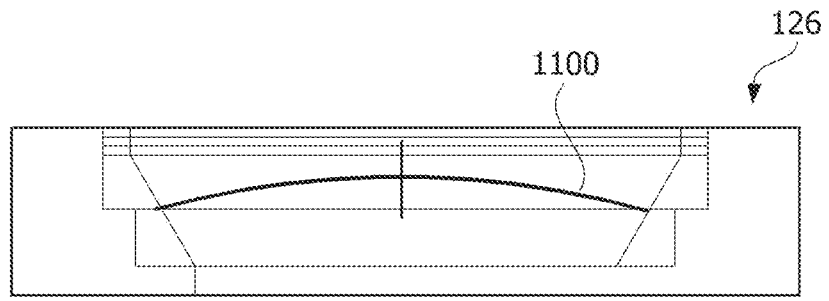
(a)
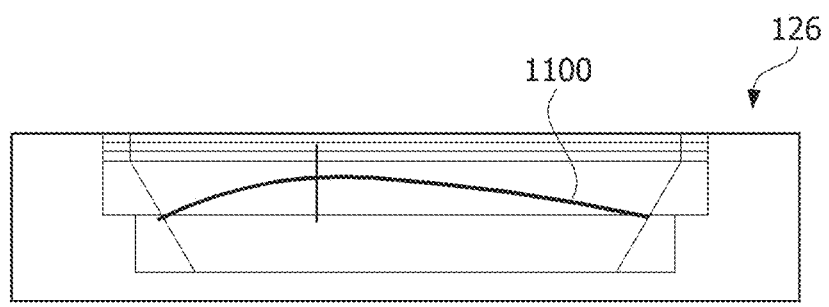
(b)
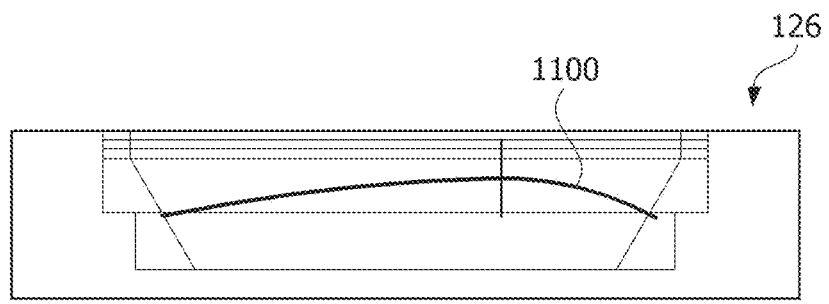
(c)

[FIG. 14]
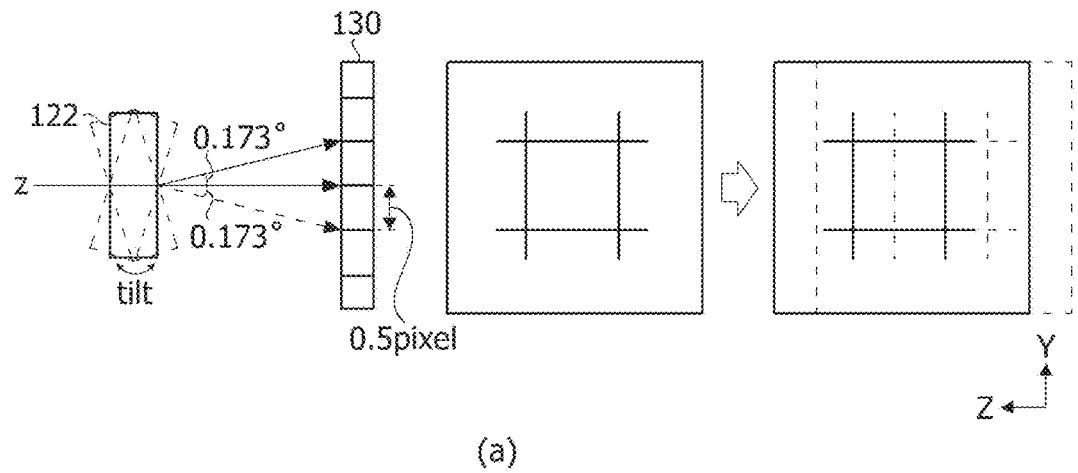
(a)
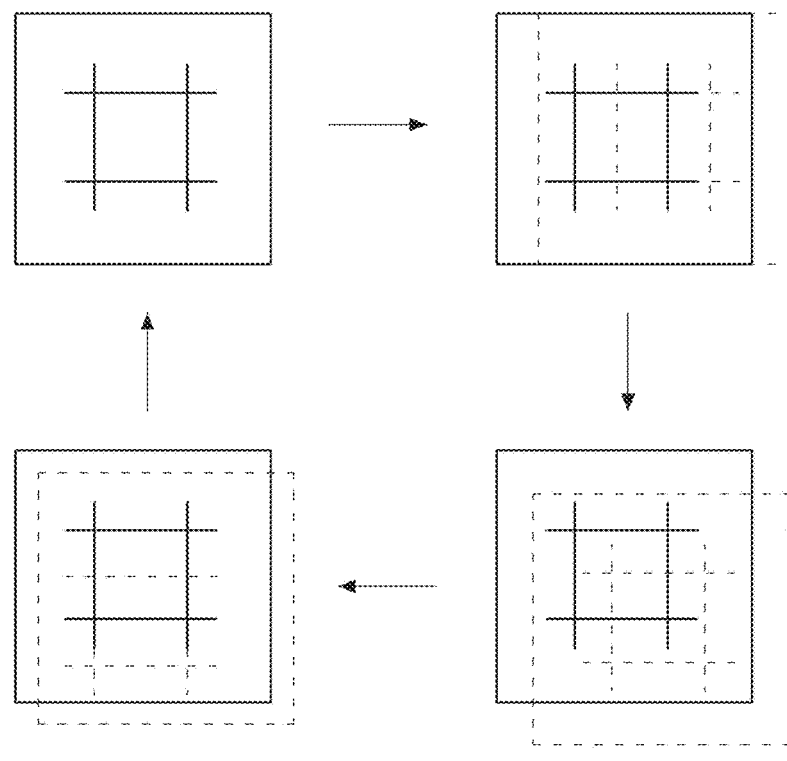
(b)

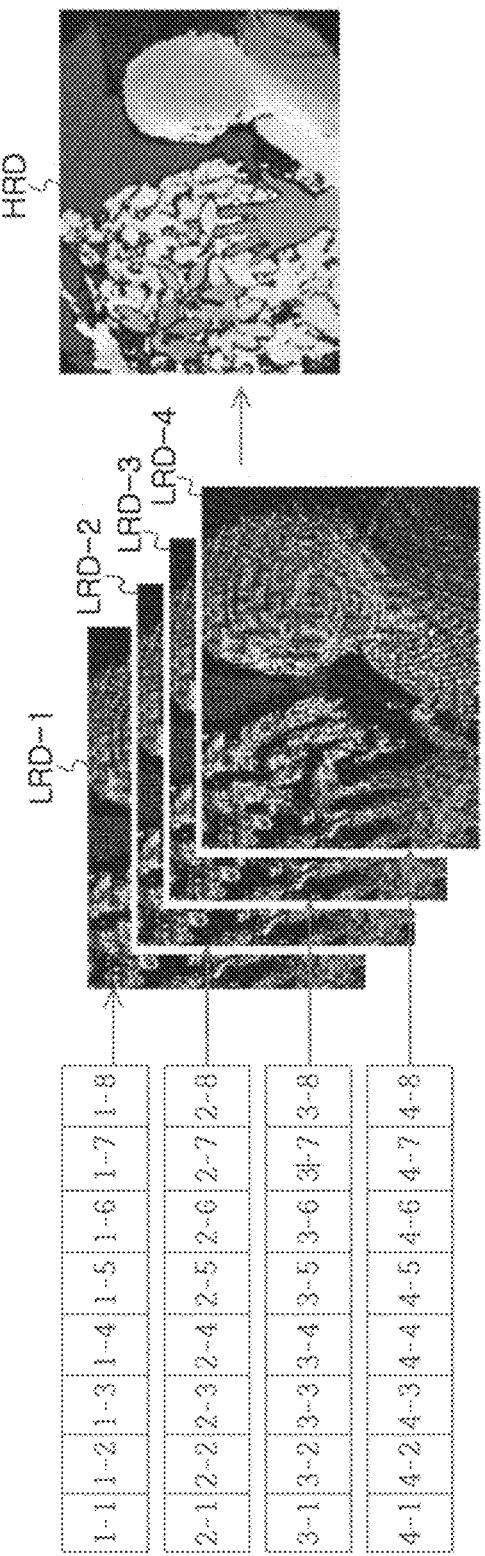
[FIG. 15]

[FIG. 17]
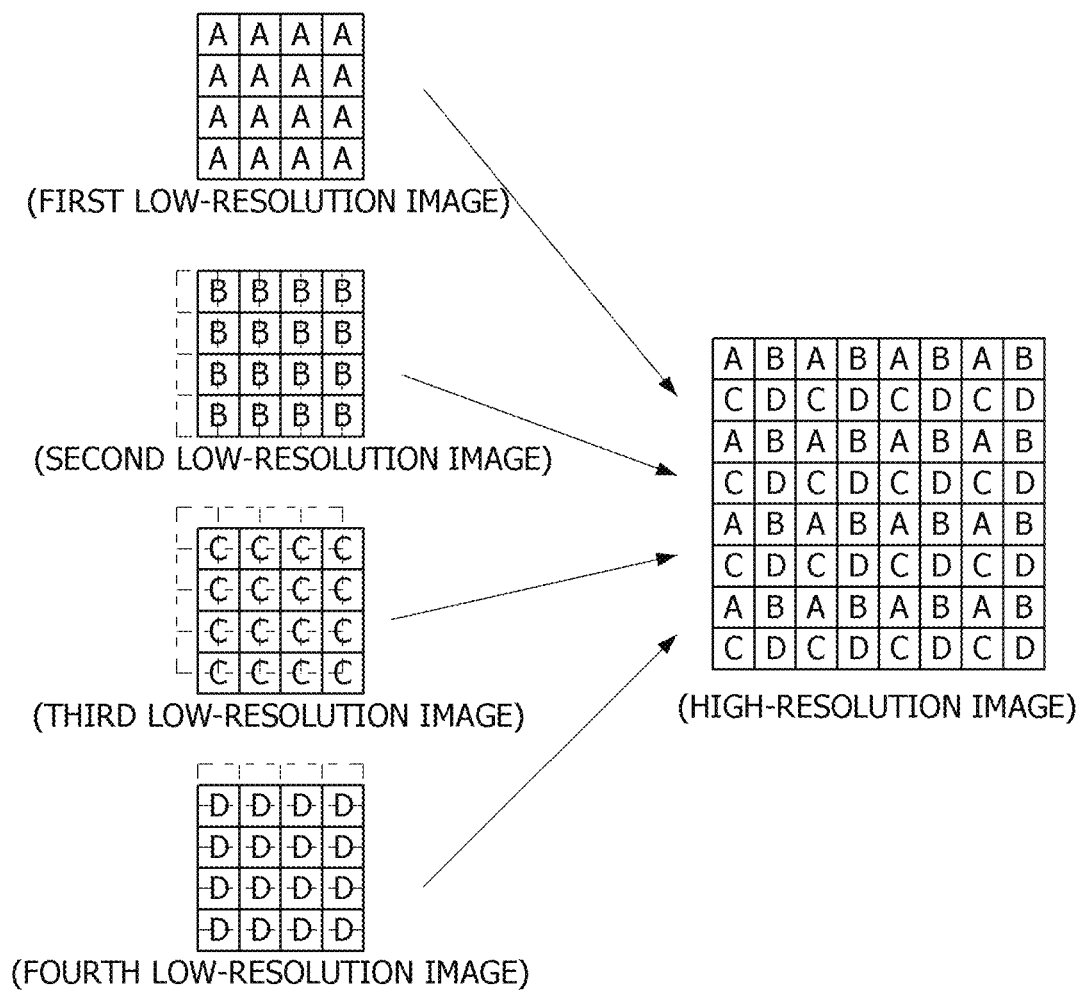

[FIG. 18]
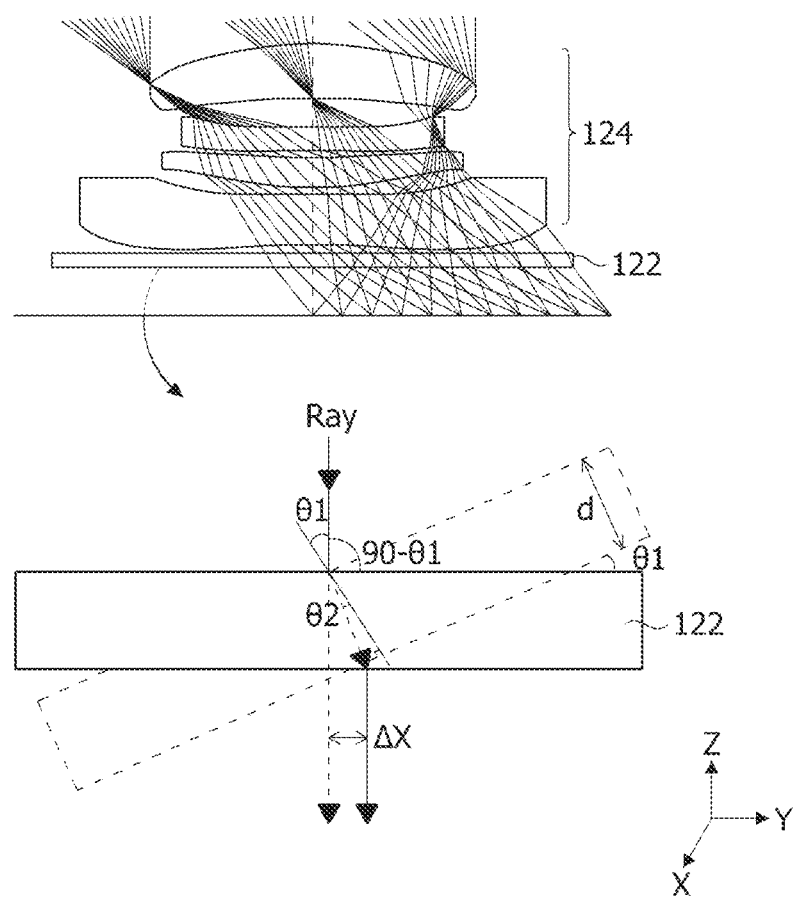

[FIG. 19]
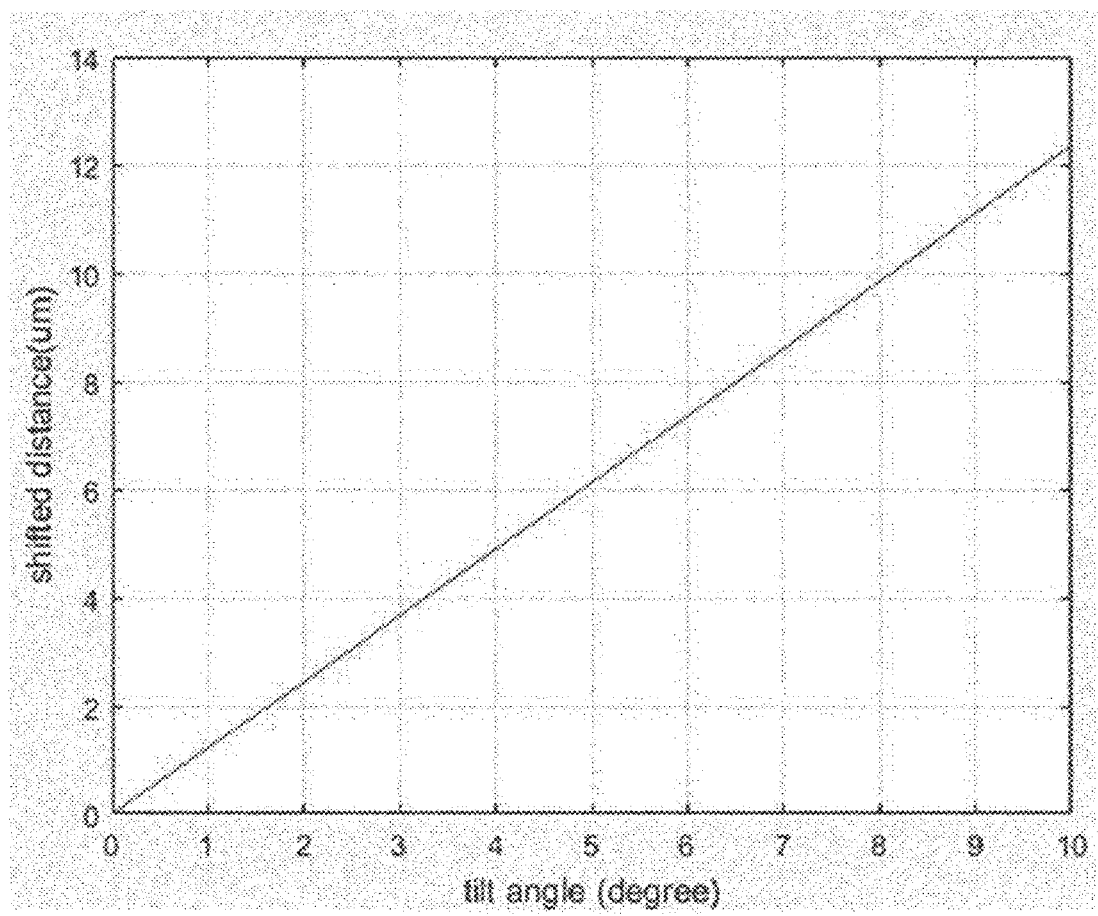

CAMERA DEVICE HAVING SHIFTABLE OPTICAL PATH

CROSS REFERENCE TO RELATED APPLICATIONS

This application is the National Phase of PCT International Application No. PCT/KR201.9/012548, filed on Sep. 27. 2019, which claims priority under 35 U.S.C. 119(a) to Patent Application No. 10-2018-0116463, filed in the Republic of Korea on Sep. 28, 2018, all of which are hereby expressly incorporated by reference into the present application.

FIELD OF TECHNOLOGY

The present invention relates to a camera device capable of extracting depth information.

BACKGROUND OF TECHNOLOGY 3D content is applied in many fields such as education, manufacturing and autonomous driving as well as games and culture, and depth map is required to generate 3D content. The depth map is information on distances in space, and represents perspective information of another point with respect to one point of a 2D image.

As a method of acquiring depth map, a method of projecting IR (Infrared) structured light onto an object, a method of using a stereo camera and a method of TOF (Time of Flight) have been used. According to the TOF method, the distance to the object is calculated by measuring flight time, that is, the time that light is emitted and reflected. The biggest advantage of the TOF method is that it provides fast, real-time distance information for 3D space. Further, users can obtain accurate distance information without applying a separate algorithm or performing hardware correction. Still further, accurate depth map can be obtained in the case of even measuring a very close subject or measuring a moving subject.

Accordingly, there is an attempt to use the TOF method for biometric authentication. For example, it is known that the shape of veins spreading on the fingers and the like does not change throughout a life, starting from the time of the fetus and varies from person to person. Accordingly, a vein pattern can be identified using a camera device equipped with TOF function. To this end, after photographing a finger, each finger may be detected by removing a background based on the color and shape of the finger, and a vein pattern of each finger may be extracted from the color information of each detected finger. That is, the average color of the finger, the color of the veins distributed on the finger and the color of the wrinkles on the finger may be different from each other. For example, the redness of the veins distributed on the fingers may be weaker than the average color of the fingers, and the color of wrinkles on the fingers may be darker than the average color of the fingers. Using these features, the approximate values to the vein can be calculated for each pixel, and a vein pattern can be extracted using the calculated result. In addition, an individual can be identified by comparing the extracted vein pattern of each finger and pre-registered data.

However, in order for a camera device equipped with TOF function to extract a vein pattern, it is necessary to accurately photograph a finger at a close distance, with high resolution. In particular, when the camera device is held and operated with only one hand and the vein pattern of the other hand is photographed, there is a high possibility of shaking caused by hand shaking.

DETAILED DESCRIPTION OF THE INVENTION

Problem to be Solved

The technical object of the present invention is to provide a camera device that can extract depth map using a TOF method.

Means to Solve the Problems

A camera device according to an embodiment of the present invention may include a light output unit that outputs an output light signal to be irradiated to an object, a lens unit that condenses an input light signal reflected from the object, an image sensor that generates an electric signal from the input light signal condensed by the lens unit and an image processing unit that extracts a depth information of the object using at least one of a time difference and a phase difference between the output light signal and the input light signal received by the image sensor, the lens unit including IR (InfraRed) filter, a plurality of solid lenses disposed on the IR filter and a liquid lens disposed on the plurality of solid lenses, or disposed between the plurality of solid lenses, the camera device further including a first driving unit that controls shifting of the IR filter or the image sensor and a second driving unit that controls a curvature of the liquid lens, an optical path of the input light signal being repeatedly shifted according to a predetermined rule by one of the first driving unit and the second driving unit, and the optical path of the input light signal being shifted according to predetermined control information by the other one of the first driving unit and the second driving unit.

According to the predetermined rule, the optical path of the input light signal may be shifted by a subpixel unit that is greater than 0 pixels and less than 1 pixel of the image sensor in a first direction for a first period, shifted by the subpixel unit in a second direction perpendicular to the first direction for a second period, shifted by the subpixel unit in a third direction perpendicular to the second direction for a third period, and shifted by the subpixel unit in a fourth direction perpendicular to the third direction for a fourth period, and the predetermined control information may have control information for OIS (Optical Image Stabilization).

The optical path of the input light signal may be further shifted according to control information for AF (autofocusing) by the second driving unit.

The control information for OIS may be extracted from at least one of motion information and posture information of the camera device.

The optical path of the input light signal may be shifted according to the predetermined rule by the first driving unit, and the optical path of the input light signal may be shifted according to the control information for OIS by the second driving unit.

The first driving unit may control the IR filter or the image sensor to be regularly tilted at a predetermined angle with respect to a plane perpendicular to an optical axis.

The optical path of the input light signal may be shifted according to the control information for OIS by the first driving unit, and the optical path of the input light signal may be shifted according to the predetermined rule by the second driving unit.

The first driving unit may control the IR filter or the image sensor to be shifted in a direction perpendicular to an optical axis.

An image processing method of a camera device according to an embodiment of the present invention may include the steps of outputting an output light signal to irradiate an object, shifting an optical path of an input light signal that is reflected from the object and condensed by a lens unit to reach an image sensor and extracting a depth map of the object using at least one of a time difference and a phase difference between the output light signal and the input light signal received by the image sensor, the step of shifting including the steps of repeatedly shifting the optical path of the input light signal according to a predetermined rule and shifting the optical path of the input light signal according to predetermined control information.

The predetermined control information may include control information for OIS (Optical Image Stabilization) extracted from at least one of motion information and posture information of the camera device.

Effects of the Invention

The camera device according to an embodiment of the present invention can simultaneously perform SR function and OIS function, and thus, the depth map with high resolution and high quality can be obtained. In particular, since the SR function and the OIS function are performed by a separate driving unit, each of the SR function and OIS function can be performed more precisely.

BRIEF DESCRIPTION OF THE DRAWINGS

FIG. 1 is a block diagram of a camera device according to an embodiment of the present invention.

FIG. 2 is a diagram illustrating a frequency of an output light signal.

FIG. 3 is a diagram illustrating a process for generating an electric signal according to an embodiment of the present invention.

FIG. 4 is a diagram illustrating an image sensor according to an embodiment of the present invention.

FIG. 5 is a raw image of four phases obtained from a camera device according to an embodiment of the present invention.

FIG. 6 is an amplitude image obtained from a camera device according to an embodiment of the present invention.

FIG. 7 is a depth image obtained from a camera device according to an embodiment of the present invention.

FIG. 8 is a block diagram of a camera device according to an embodiment of the present invention.

FIG. 9 is a side view of a camera device according to an embodiment of the present invention.

FIG. 10 is a cross-sectional view of a part of a camera device according to an embodiment of the present invention.

FIG. 11 is a cross-sectional view of a part of a camera device according to another embodiment of the present invention.

FIG. 12 is an example of a liquid lens included in a camera device according to an embodiment of the present invention.

FIG. 13 is another example of a liquid lens included in a camera device according to an embodiment of the present invention.

FIG. 14 is a diagram illustrating a change of an optical path of an input light signal by a first driving unit.

FIGS. 15 and 16 are diagrams illustrating an SR technique according to an embodiment of the present invention.

FIG. 17 is a diagram illustrating a pixel value displacement process according to an embodiment of the present invention.

FIGS. 18 to 19 are diagrams illustrating a shifting effect of an image frame input on an image sensor according to a tilt controlling of an IR filter.

EMBODIMENT OF PRACTICING THE INVENTION

Figure 16:
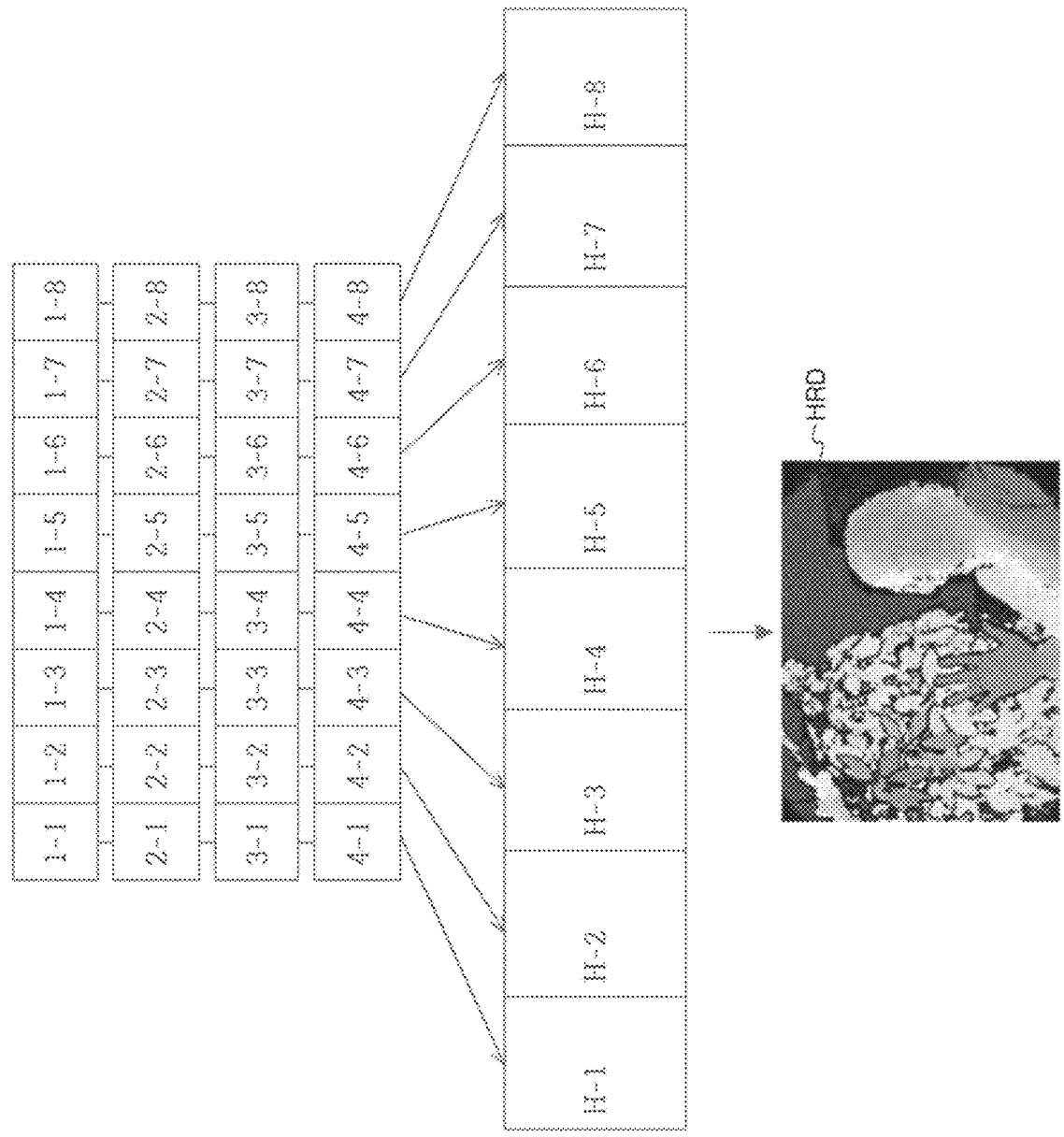

Hereinafter, preferred embodiments of the present invention will be described in detail with reference to the accompanying drawings.

However, the technical idea of the present invention is not limited to some embodiments to be described, but may be implemented in various different forms, and within the scope of the technical idea of the present invention, one or more of the constituent elements may be selectively combined and substituted between the embodiments.

In addition, the terms (including technical and scientific terms) used in the embodiments of the present invention are generally understood by those of ordinary skill in the art, unless explicitly defined and described. It can be interpreted as a meaning, and terms generally used, such as terms defined in a dictionary, may be interpreted in consideration of the meaning in the context of the related technology.

In addition, the terms used in the embodiments of the present invention are for describing the embodiments and are not intended to limit the present invention.

In the present specification, the singular form may include the plural form unless specifically stated in the phrase, and when described as "at least one (or more than one) of A and (with) B and C", it is combined with A, B, and C. It may contain one or more of all possible combinations.

In addition, terms such as first, second, A, B, (a), and (b) may be used in describing the constituent elements of the embodiment of the present invention.

These terms are only for distinguishing the component from other components, and are not limited to the nature, order, or sequence of the component by the term.

And, when a component is described as being 'connected', 'coupled' or 'contacted' to another component, the component is not only directly connected, coupled or contacted to the other component, but also the component is 'connected', 'coupled' or 'contacted' to the other component due to another component between the elements.

In addition, when it is described as being formed or disposed in the "top (upper) or bottom (lower)" of each component, the top (upper) or bottom (lower) includes the case where two components are in direct contact with each other, as well as when one or more other components are formed or disposed between the two components. In addition, when expressed as "top (upper) or bottom (lower)", the meaning of not only an upward direction but also a downward direction based on one component may be included.

FIG. 1 is a block diagram of a camera device according to an embodiment of the present invention.

Referring to FIG. 1, a camera device 100 includes a light output unit 110, a lens unit 120, an image sensor 130 and an image processing unit 140.

The light output unit 110 generates an output light signal, and then, irradiates the signal to an object. In this case, the light output unit 110 may generate and output the output light signal in the form of a pulse wave or a continuous wave. The continuous wave may be in the form of a sinusoid wave or a square wave. By generating the output light signal in the form of the pulse wave or the continuous wave, the camera device 100 can detect a phase difference between the output light signal output from the light output unit 110 and the input light signal input to the camera device 100 after being reflected from the object. In this specification, the output light may be the light that is output from the light output unit 110 and input to the object, and the input light may be the light that is output from the light output unit 110, reaches the object, is reflected from the object, and then, is input to the camera device 100. From the point of view of the object, the output light may be incident light, and the input light may be reflected light.

The light output unit 110 irradiates the generated output light signal to the object for a predetermined integration time. Here, an integration time means one frame period. When generating a plurality of frames, a set integration time is repeated. For example, when the camera device 100 photographs the object at 20 FPS, the integration time is 1/20 [sec]. In addition, when 100 frames are generated, the integration time may be repeated 100 times.

The light output unit 110 may generate a plurality of output light signals having different frequencies. The light output unit 110 may sequentially repeatedly generate a plurality of output light signals having different frequencies. Alternatively, the light output unit 110 may simultaneously generate a plurality of output light signals having different frequencies.

FIG. 2 is a diagram illustrating a frequency of an output light signal. According to the embodiment of the present invention, the light output unit 110 may be controlled to generate the output light signal having a frequency $f_1$ for the first half of the integration time, and to generate the output light signal having a frequency $f_2$ during the other half of the integration time, as shown in FIG. 2.

According to another embodiment, the light output unit 110 may control some of a plurality of light emitting diodes to generate the output light signal having the frequency $f_1$, and control the remaining light emitting diodes to generate the output light signal having the frequency $f_2$.

To this end, the light output unit 110 may include a light source 112 that generates light and a light modulator 114 that modulates light.

First, the light source 112 generates light. The light generated by the light source 112 may be infrared rays having a wavelength of 770 to 3000 nm, or visible light having a wavelength of 380 to 770 nm. The light source 112 may use a light emitting diode (LED), and may have a form in which a plurality of light emitting diodes is arranged in a predetermined pattern. In addition, the light source 112 may include an organic light emitting diode (OLED) or a laser diode (LD). Alternatively, the light source 112 may be a VCSEL (Vertical Cavity Surface Emitting Laser). The VCSEL is one of laser diodes that converts an electrical signal into an optical signal, and may use a wavelength of about 800 to 1000 nm, for example, about 850 nm or about 940 nm.

The light source 112 repeatedly flashes (on/off) at a predetermined time interval to generate the output light signal in the form of the pulse wave or the continuous wave. The predetermined time interval may be the frequency of the output light signal. Flashing of the light source may be controlled by the light modulator 114.

The light modulator 114 controls the flashing of the light source 112 so that the light source 112 generates the output light signal in the form of the continuous wave or the pulse wave. The light modulator 114 may control the light source 112 to generate the output light signal in the form of the continuous wave or the pulse wave by way of frequency modulation or pulse modulation.

Meanwhile, the lens unit 120 condenses the input light signal reflected from the object and transmits it to the image sensor 130.

The image sensor 130 generates an electric signal by using the input light signal condensed through the lens unit 120.

The image sensor 130 may absorb the input light signal in synchronization with the flashing period of the light output unit 110. In more detail, the image sensor 130 may absorb the light at each of in phase and out phase of the output light signal output from the light output unit 110. That is, the image sensor 130 may repeatedly perform the step of absorbing the incident light signal when the light source is on and the step of absorbing the incident light signal when the light source is off.

Next, the image sensor 130 may generate an electric signal corresponding to each reference signal by using a plurality of reference signals having different phase differences. The frequency of the reference signal may be set equal to the frequency of the output light signal output from the light output unit 110. Accordingly, when the light output unit 110 generates an output light signal with a plurality of frequencies, the image sensor 130 generates an electrical signal using a plurality of reference signals each corresponding to each frequency. The electrical signal may include information on an amount of charge or voltage corresponding to each reference signal.

FIG. 3 is a diagram illustrating a process for generating an electric signal according to the embodiment of the present invention.

As shown in FIG. 3, there may be four reference signals ($C_1$ to $C_4$) according to the embodiment of the present invention. Each of the reference signals ($C_1$ to $C_4$) may have the same frequency as the output light signal, but may have a phase difference of 90 degrees from each other. One ($C_1$) of the four reference signals may have the same phase as the output light signal. The phase of the input light signal is delayed by the distance from which the output light signal is incident on the object and reflected back. The image sensor 130 mixes the input light signal and each reference signal, respectively. Then, the image sensor 130 may generate the electric signal corresponding to the shaded portion of FIG. 3 for each reference signal.

In another embodiment, when an output light signal is generated at a plurality of frequencies for an exposure time, the image sensor 130 absorbs an input light signal according to the plurality of frequencies. For example, it is assumed that the output light signal is generated at frequencies $f_1$ and $f_2$, and a plurality of reference signals has a phase difference of 90 degrees. Then, since the incident light signal also has frequencies $f_1$ and $f_2$, four electrical signals may be generated with the input light signal having the frequency of $f_1$ and four reference signals corresponding thereto. In addition, four electrical signals may be generated with the input light signal having a frequency of $f_2$ and four reference signals corresponding thereto. Thus, a total of 8 electrical signals can be generated.

The image sensor 130 may be configured in a structure in which a plurality of pixels is arranged in a grid form. The image sensor 130 may be a CMOS(Complementary Metal Oxide Semiconductor) image sensor, or may be a CCD (Charge Coupled Device) image sensor. In addition, the image sensor 130 may include a ToF sensor that receives infrared light reflected from a subject and measures a distance using time or phase difference.

FIG. 4 is a diagram illustrating an image sensor according to the embodiment of the present invention. For example, in the case of the image sensor 130 having a resolution of 320×240 as shown in FIG. 4, 76,800 pixels are arranged in a grid form. In this case, a constant interval may be formed between the plurality of pixels as in the shaded portion of FIG. 4. In the embodiment of the present invention, 1 pixel is described to include a predetermined interval adjacent to the pixel.

According to the embodiment of the present invention, each pixel 132 may include a first light receiving unit 132-1 having a first photodiode and a first transistor, and a second light receiving unit 132-2 having a second photodiode and a second transistor.

The first light receiving unit 132-1 receives an input light signal at the same phase as the waveform of the output light. That is, when the light source is turned on, the first photodiode is turned on to absorb the input light signal. When the light source is turned off, the first photodiode is turned off to stop absorbing input light. The first photodiode converts the absorbed input light signal into current and transmits it to the first transistor. The first transistor converts the received current into an electric signal and outputs it.

The second light receiving unit 132-2 receives the input light signal at a phase opposite to the waveform of the output light. That is, when the light source is turned on, the second photodiode is turned off to absorb the input light signal. When the light source is turned off, the second photodiode is turned on to stop absorbing the input light. The second photodiode converts the absorbed input light signal into current and transmits it to the second transistor. The second transistor converts the received current into an electric signal.

Accordingly, the first light receiving unit 132-1 may be referred to as an In Phase receiving unit, and the second light receiving unit 132-2 may be referred to as an Out Phase receiving unit. In this way, when the first light receiving unit 132-1 and the second light receiving unit 132-2 are activated with a time difference, there is a difference in the amount of received light depending on the distance to an object. For example, when the object is directly in front of the camera device 100 (that is, when the distance is 0), the time that it takes to be reflected from the object after the light is output from the lighting unit 110 is 0, so the flashing period of the light source is a light reception cycle as it is. Accordingly, only the first light receiving unit 132-1 receives the light, and the second light receiving unit 132-2 does not receive the light. As another example, if the object is located a predetermined distance away from the camera device 100, since it takes time to be reflected from the object after the light is output from the lighting unit 110, the flashing period of the light source is different from the light reception period. Accordingly, a difference occurs in the amount of light received by the first light receiving unit 132-1 and the second light receiving unit 132-2. That is, the distance of the object may be calculated using the difference between the amount of light input to the first light receiving unit 132-1 and the second light receiving unit 132-2. Referring back to FIG. 1, the image processing unit 140 calculates a phase difference between the output light and the input light using the electric signal received from the image sensor 130, and calculates the distance between the object and the camera device 100 using the phase difference.

Specifically, the image processing unit 140 may calculate the phase difference between the output light and the input light using the information on the amount of charge of the electric signal.

As described above, four electrical signals may be generated for each frequency of the output light signal. Accordingly, the image processing unit 140 may calculate the phase difference ($t_d$) between the output light signal and the input light signal using Equation 1 below.

$$t_d = \arctan\left(\frac{Q_3 - Q_4}{Q_1 - Q_2}\right) \quad \text{[Equation 1]}$$

Here, $Q_1$ to $Q_4$ are the charge amounts of each of the four electric signals. $Q_1$ is the electric charge of the electric signal corresponding to the reference signal of the same phase as the output light signal. $Q_2$ is the electric charge of the electric signal corresponding to the reference signal whose phase is 180 degrees slower than the output light signal. $Q_3$ is the electric charge of the electric signal corresponding to the reference signal whose phase is 90 degrees slower than the output light signal. $Q_4$ is the electric charge of the electric signal corresponding to the reference signal whose phase is 270 degrees slower than the output light signal.

Then, the image processing unit 140 may calculate the distance between the object and the camera device 100 by using the phase difference between the output light signal and the input light signal. In this case, the image processing unit 140 may calculate the distance (d) between the object and the camera device 100 using Equation 2 below.

$$d = \frac{c}{2f} \frac{t_d}{2\pi} \quad \text{[Equation 2]}$$

where c is the speed of light and f is the frequency of the output light.

According to the embodiment of the present invention, a ToF IR image and a depth image may be obtained from the camera device 100. Accordingly, the camera device according to the embodiment of the present invention may be referred to as a ToF camera device or a ToF camera module.

In more detail in this regard, as illustrated in FIG. 5, the raw images for four phases may be obtained from the camera device 100 according to the embodiment of the present invention. Here, the four phases may be 0°, 90°, 180° and 270°, and the raw image for each phase may be the image composed of digitized pixel values for each phase, and may be mixed with a phase image and a phase IR image.

If the four phase images of FIG. 5 are used and calculated by using Equation 3, an amplitude image of the ToF IR image of FIG. 6 may be obtained.

$$\text{Amplitude} = \frac{1}{2}\sqrt{(\text{Raw}(x_{90}) - \text{Raw}(x_{270}))^2 + (\text{Raw}(x_{180}) - \text{Raw}(x_0))^2} \quad \text{[Equation 3]}$$

Here, Raw($x_0$) may be the data value for each pixel received by a sensor at phase 0°, Raw($x_{90}$) may be the data value for each pixel received by the sensor at phase 90°, Raw($x_{180}$) may be the data value for each pixel received by the sensor at phase 180°, and Raw ($x_{270}$) may be the data value for each pixel received by the sensor at phase 270°.

Alternatively, if the four phase images of FIG. 5 are used and calculated by using Equation 4, an intensity image that is another ToF IR image may be obtained.

$$\text{Intensity} = |\text{Raw}(x_{90}) - \text{Raw}(x_{270})| + |\text{Raw}(x_{180}) - \text{Raw}(x_0)| \quad \text{[Equation 4]}$$

Here, $\text{Raw}(x_0)$ may be the data value for each pixel received by a sensor at phase 0°, $\text{Raw}(x_{90})$ may be the data value for each pixel received by the sensor at phase 90°, $\text{Raw}(x_{180})$ may be the data value for each pixel received by the sensor at phase 180°, and $\text{Raw}(x_{270})$ may be the data value for each pixel received by the sensor at phase 270°.

As described above, the ToF IR image is the image generated through a process of subtracting two of the four phase images from each other, and during this process, background light may be removed. Accordingly, only the signal in the wavelength band output from the light source remains in the ToF IR image, thereby increasing the IR sensitivity of the object and reducing noise significantly.

In the present specification, the ToF IR image may mean an amplitude image or an intensity image, and the intensity image may be commonly used with a confidence image. As shown in FIG. 6, the ToF IR image may be a gray image.

On the other hand, if the four phase images of FIG. 5 are used and calculated by using Equations 5 and 6, the depth image of FIG. 7 can also be obtained.

$$\text{Phase} = \arctan\left(\frac{\text{Raw}(x_{90}) - \text{Raw}(x_{270})}{\text{Raw}(x_{180}) - \text{Raw}(x_0)}\right) \quad \text{[Equation 5]}$$

$$\text{Depth} = \frac{1}{2f} c \frac{\text{Phase}}{2\pi} \quad (c = \text{speed of light}) \quad \text{[Equation 6]}$$

Meanwhile, in the embodiment of the present invention, in order to raise the resolution of a depth image, a super resolution (SR) technique is used. The SR technique is a technique for obtaining a high-resolution image from a plurality of low-resolution images, and a mathematical model of the SR technique can be expressed as Equation 7.

$$y_K = D_K B_K M_K x + n_K \quad \text{[Equation 7]}$$

Here, $1 \leq k \leq p$, p is the number of low-resolution images, $y_k$ is the low-resolution image $(= [y_{k,1}, y_{k,2}, \ldots, y_{k,M}]^T$, where $M = N_1 * N_2)$, $D_k$ is a down sampling matrix, $B_k$ is an optical blur matrix, $M_k$ is an image warping matrix, x is the high-resolution image $(= [x_1, x_2, \ldots, x_N]^T$, where $N = L_1 N_1 * L_2 N_2)$, $n_k$ represents noise. That is, according to the SR technique, it is a technique for estimating x by applying the inverse function of the estimated resolution degradation elements to $y_k$. The SR technique can be largely divided into a statistical scheme and a multi-frame scheme, and the multi-frame scheme can be largely divided into a space division scheme and a time division scheme. When the SR technique is used to acquire the depth image, since the inverse function of $M_k$ in Equation 1 does not exist, the statistical scheme can be attempted. However, in the case of the statistical scheme, since an iterative calculation process is required, there is a problem of low efficiency.

In order to apply the SR technique to extracting depth map, the image processing unit 140 generates a plurality of low-resolution subframes using the electric signal received from the image sensor 130, and then, uses the plurality of low-resolution subframes to extract a plurality of low-resolution depth maps. In addition, a high-resolution depth map may be extracted by reconstructing the pixel values of the plurality of low-resolution depth maps.

Here, the high resolution is a relative meaning indicating a higher resolution than a low resolution.

Here, the subframe may mean image data generated from the electrical signal corresponding to any reference signal for any integration time. For example, when an electrical signal is generated by eight reference signals for a first integration time, that is, in one image frame, eight subframes may be generated and one start of frame may be further generated. In this specification, the subframe may be commonly used with image data, subframe image data, and the like.

Alternatively, in order to apply the SR technique according to the embodiment of the present invention in extracting depth map, the image processing unit 140 may generate a plurality of low-resolution subframes using the electric signal received from the image sensor 130, and then, generate a plurality of high-resolution subframes by reconstructing the pixel values of the plurality of low-resolution subframes. And, a high-resolution depth map can be extracted by using the high-resolution subframes.

For this, a pixel shift technique may be used. That is, after acquiring several image data shifted by subpixel for each subframe using the pixel shift technique, a plurality of high-resolution subframe image data may be obtained by applying the SR technique for each subframe, and the depth image with high resolution may be extracted by using the obtained data.

On the other hand, when the camera device 100 according to the embodiment of the present invention is applied to an application that requires high-quality image capture, for example, when applied to an application that requires a precise image such as biometric authentication or the like, or when applied to an application that requires a user to manipulate the camera device 100 using only one hand and photograph, a technique for preventing or correcting image shaking due to hand shake is also required. A technology for preventing or correcting image blur can be referred to as an OIS (Optical Image Stabilizer) technique. In the OIS technique, the shaking of an image can be prevented or corrected by moving the structural component in the camera device 100, for example, a lens in the direction of the X and Y axes perpendicular to an optical axis when the optical axis is called the Z axis.

In order for the camera device 100 to have the SR function and the OIS function, the camera device 100 according to the embodiment of the present invention may further include a driving unit for moving an internal structure.

FIG. 8 is a block diagram of a camera device according to an embodiment of the present invention, FIG. 9 is a side view of a camera device according to an embodiment of the present invention, FIG. 10 is a cross-sectional view of a part of the camera device according to an embodiment of the present invention, and FIG. 11 is a cross-sectional view of a part of a camera device according to another embodiment of the present invention. Here, for convenience of description, duplicate descriptions of the same contents as in FIGS. 1 to 7 are omitted.

Referring to FIG. 8, the camera device 100 according to an embodiment of the present invention further includes a first driving unit 150 and a second driving unit 160.

Referring to FIGS. 8 to 11, the image sensor unit 130 may be disposed on a printed circuit board 900, and the image processing unit 140 may be implemented in the printed circuit board 900. A transmitting portion (Tx), that is, the light output unit 110 may be disposed on the side of the receiving portion (Rx) on the printed circuit board 900.

Referring to FIGS. 10 to 11, which are cross-sectional views of the receiving portion (Rx) of the camera device 100, the lens unit 120 includes an IR (InfraRed) filter 122, a plurality of solid lenses 124 disposed on the IR filter, and a plurality of liquid lens 126 disposed on the plurality of solid lenses 124 or disposed between the plurality of solid lenses 124. The method in which the liquid lens 126-1 is disposed on the plurality of solid lenses 124 is referred to as an add-on method, and the method in which the liquid lens 126-2 is disposed between the plurality of solid lenses 124 is referred to as an add-in method. In the case of the add-on method, the liquid lens 126-1 may be supported by a shaper (not shown) outside the lens unit 120 and may be tilted.

The liquid lens 126 may be a membrane type liquid lens shown in FIG. 12 or a Y lens type liquid lens shown in FIG. 13, but is not limited thereto, and it can be a variable lens whose shape varies according to an applied voltage. For example, as shown in FIG. 12, the liquid lens 126 may be in a form filled with liquid in the membrane, and according to the voltage applied to the ring 1002 surrounding the edge of the liquid-filled membrane 1000 the shape of the liquid-filled membrane can be convex, flattened or concave. As another example, as shown in FIG. 13, the liquid lens 126 may include two types of liquids (e.g., a conductive liquid and a non-conductive liquid) having different properties, and between the two types of liquids, an interface 1100 may be formed, and the curvature and slope of the interface may be changed according to the applied voltage.

The plurality of solid lenses 124 and the liquid lenses 126 may be aligned with respect to a central axis to form an optical system. Here, the central axis may be the same as the optical axis of the optical system, and may be referred to as the Z axis in this specification.

The lens unit 120 may further include a lens barrel 128, and a space capable of accommodating at least a part of the lens may be provided inside the lens barrel 128. The lens barrel 128 may be rotationally coupled to one or a plurality of lenses, but this is exemplary, and may be coupled in other ways such as a method using an adhesive (e.g., an adhesive resin such as epoxy).

The lens holder (not shown) may be coupled to the lens barrel 128 to support the lens barrel 128, and may be coupled to a printed circuit board (not shown) on which the image sensor 130 is mounted. A space in which the IR filter 122 can be attached may be formed under the lens barrel 126 by a lens holder (not shown). A spiral pattern may be formed on the inner circumferential surface of the lens holder, and similarly, it may be rotationally coupled to the lens barrel 128 having a spiral pattern formed on the outer circumferential surface. However, this is exemplary, and the lens holder and the lens barrel 128 may be coupled by an adhesive, or the lens holder and the lens barrel 128 may be integrally formed.

However, this exemplary illustration is only an example, and the lens barrel and lens holder of the lens unit 120 may be composed of various structures capable of condensing the input light signal incident to the camera device 100 and transmitting it to the image sensor unit 130.

According to the embodiment of the present invention, the first driving unit 150 controls the movement of the IR filter 122 or the image sensor 130, and the second driving unit 160 controls the curvature of the liquid lens 126. Here, the first driving unit 150 may include an actuator directly or indirectly connected to the IR filter 122 or the image sensor 130, the actuator may include at least one of MEMS (Micro Electro Mechanical Systems), VCM (Voice Coil Motor) and a piezoelectric element. In addition, the second driving unit 160 is directly or indirectly connected to the liquid lens 126 and it may control the curvature of the liquid lens 126 by directly applying a voltage to the liquid lens 126 or controlling the voltage applied to the liquid lens 126.

The optical path of the input light signal may be repeatedly shifted according to a predetermined rule by one of the first driving unit 150 and the second driving unit 160, and the optical path of the input light signal may be shifted according to predetermined control information by the other one of the first driving unit 150 and the second driving unit 160.

When the optical path of the input light signal is repeatedly shifted according to the predetermined rule, the SR function can be performed using the shifted optical path. In addition, when the optical path of the input light signal is shifted according to the predetermined control information, the OIS function may be performed using the shifted optical path. For example, the predetermined control information may include control information for OIS that is extracted from the motion information, posture information, and the like of the camera device 100.

Hereinafter, an embodiment in which the SR function is performed by the first driving unit 150 and the OIS function is performed by the second driving unit 160 will be described first.

As described above, the camera device 100 according to the embodiment of the present invention may perform the SR technique using a pixel shift technology.

For pixel shifting, the first driving unit 150 may move the inclination of the IR filter 122 or the image sensor 130. That is, the first driving unit 150 may tilt the IR filter 122 or the image sensor 130 to have a predetermined inclination with respect to a XY plane, which is a plane perpendicular to the optical axis (Z axis). Accordingly, the first driving unit 150 may change the optical path of at least one of the input light signals in a unit of subpixel of the image sensor 130. Here, the subpixel may be a unit larger than 0 pixel and smaller than 1 pixel.

The first driving unit 150 changes the optical path of at least one of the input light signals for an image frame. As described above, one image frame may be generated per one integration time. Accordingly, when one integration time ends, the first driving unit 150 changes the optical path of at least one of the output light signal or the input light signal.

The first driving unit 150 changes the optical path of at least one of the output light signal or the input light signal by a subpixel unit based on the image sensor 130. At this time, the first driving unit 150 changes the optical path of at least one of the input light signals in one of up, down, left and right directions based on the current optical path.

FIG. 14 is a diagram illustrating a change of an optical path of an input light signal by a first driving unit.

In (a) of FIG. 14, a portion indicated by a solid line indicates a current optical path of an input light signal, and a portion indicated by a dotted line indicates a changed optical path. When the integration time corresponding to the current optical path ends, the first driving unit 150 may change the optical path of the input light signal as shown in the dotted line. Then, the path of the input light signal is shifted by subpixel from the current optical path. For example, as shown in (a) of FIG. 14, when the first driving unit 150 shifts the current optical path to the right by 0.173 degrees, the input light signal incident on the image sensor 130 can shift to the right by 0.5 pixels (subpixels).

According to the embodiment of the present invention, the first driving unit 150 may change the optical path of the input light signal clockwise from a reference position. For example, as shown in (b) of FIG. 14, after the first integration time ends, the first driving unit 150 shifts the optical path of the input light signal to the right by 0.5 pixels based on the image sensor 130 for the second integration time. In addition, the first driving unit 150 shifts the optical path of the input light signal downward by 0.5 pixels based on the image sensor 130 for the third integration time. In addition, the first driving unit 150 shifts the optical path of the input light signal to the left by 0.5 pixels based on the image sensor 130 for the fourth integration time. In addition, the first driving unit 150 shifts the optical path of the input light signal upward by 0.5 pixels based on the image sensor 130 for the fifth integration time. That is, the first driving unit 150 may shift the optical path of the input light signal to the original position for four exposure cycles. This can be applied in the same way when shifting the optical path of the output light signal, and a detailed description thereof will be omitted. Also, it is only an example that the changing pattern of the optical path is clockwise, and may be counterclockwise.

Meanwhile, the subpixel may be larger than 0 pixel and smaller than 1 pixel. For example, the subpixel may have a size of 0.5 pixels, or may have a size of ⅓ pixels. The size of the subpixel can be changed by a person skilled in the art.

FIGS. 15 and 16 are diagrams illustrating an SR technique according to an embodiment of the present invention.

Referring to FIG. 15, the image processing unit 140 may extract a plurality of low-resolution depth map using a plurality of low-resolution subframes generated in the same frame, that is, for the same integration time. In addition, the image processing unit 140 may extract a high-resolution depth map by reconstructing the pixel values of the plurality of low-resolution depth map. Here, the optical paths of the output light signal or the input light signal corresponding to the plurality of low-resolution depth map may be different from each other.

For example, the image processing unit 140 may generate low-resolution subframes 1-1 to 4-8 using a plurality of electric signals. The low-resolution subframes 1-1 to 1-8 are the low-resolution subframes generated for a first integration time. The low-resolution subframes 2-1 to 2-8 are the low-resolution subframes generated for a second integration time. The low-resolution subframes 3-1 to 3-8 are the low-resolution subframes generated for a third integration time. The low-resolution subframes 4-1 to 4-8 are the low-resolution subframes generated for a fourth integration time. Then, the image processing unit 140 extracts low-resolution depth maps LRD-1 to LRD-4 by applying a depth map extraction technique to the plurality of low-resolution subframes generated in each integration time. The low-resolution depth map LRD-1 is the low-resolution depth map extracted using subframes 1-1 to 1-8. The low-resolution depth map LRD-2 is the low-resolution depth map extracted using subframes 2-1 to 2-8. The low-resolution depth map LRD-3 is the low-resolution depth map extracted using subframes 3-1 to 3-8. The low-resolution depth map LRD-4 is the low-resolution depth map extracted using subframes 4-1 to 4-8. In addition, the image processing unit 140 reconstructs the pixel values of the low-resolution depth maps LRD-1 to LRD-4 to extract a high-resolution depth map HRD.

Alternatively, as described above, the image processing unit 140 may generate a high-resolution subframe by reconstructing the pixel values of a plurality of subframes corresponding to the same reference signal. In this case, the plurality of subframes have different optical paths from those of the corresponding output light signals or input light signals. In addition, the image processing unit 140 may extract a high-resolution depth map by using the plurality of high-resolution subframes.

For example, in FIG. 16, the image controller 150 generates low-resolution subframes 1-1 to 4-8 using a plurality of electric signals. The low-resolution subframes 1-1 to 1-8 are the low-resolution subframes generated for the first integration time. The low-resolution subframes 2-1 to 2-8 are the low-resolution subframes generated for the second integration time. The low-resolution subframes 3-1 to 3-8 are the low-resolution subframes generated for the third integration time. The low-resolution subframes 4-1 to 4-8 are the low-resolution subframes generated for the fourth integration time. Here, the low-resolution subframes 1-1, 2-1, 3-1 and 4-1 correspond to the same reference signal C1, but correspond to different optical paths. Then, the image processing unit 140 may generate a high-resolution subframe H-1 by reconstructing the pixel values of the low-resolution subframes 1-1, 2-1, 3-1, and 4-1. When high-resolution subframes H-1 to H-8 are generated by pixel value reconstruction, the image controller may extract a high-resolution depth map HRD by applying a depth map extraction technique to the high-resolution subframes H-1 to H-8.

FIG. 17 is a diagram illustrating a pixel value displacement process according to an embodiment of the present invention.

Here, it is assumed that one high-resolution image of 8×8 is generated by using four of a low-resolution image of 4×4. In this case, the high-resolution pixel grid has 8×8 pixels, which are the same as pixels of the high-resolution image. Here, the low-resolution image may mean including a low-resolution subframe and low-resolution depth map, and the high-resolution image may mean a high-resolution subframe and a high-resolution depth map.

In FIG. 17, the first to fourth low-resolution images are the images photographed by shifting an optical path by a subpixel unit of 0.5 pixels. The image processing unit 140 displaces the pixel values of the second to fourth low-resolution images according to the moving directions of the optical paths based on the first low-resolution image in which the optical path has not moved, to reconstruct the high-resolution image.

Specifically, the second low-resolution image is the image shifted to the right by the subpixel from the first low-resolution image. Therefore, the pixel (B) of the second low-resolution image is displaced to the right of each pixel (A) of the first low-resolution image.

The third low-resolution image is the image shifted downward by the subpixel from the second low-resolution image. Therefore, the pixel (C) of the third low-resolution image is displaced under each pixel (B) of the second low-resolution image.

The fourth low-resolution image is the image shifted to the left by the subpixel from the third low-resolution image. Therefore, the pixel (D) of the fourth low-resolution image is displaced to the left of the pixel (C) of the third low-resolution image.

When all pixel values of the first to fourth low-resolution images are reconstructed in the high-resolution pixel grid, a high-resolution image frame with a resolution of 4 times higher than that of the low-resolution image is generated.

Meanwhile, the image processing unit 140 may apply a weight to the displaced pixel value. In this case, the weight may be set differently according to the size of the subpixel or the shifting direction of the optical path, and may be set differently for each low-resolution image.

According to one embodiment, the first driving unit 150 shifts the input light signal by controlling of the tilt of the IR filter or the image sensor, and accordingly, the data shifted by subpixel may be obtained.

FIGS. 18 to 19 are diagrams illustrating a shifting effect of an image frame input on an image sensor according to a tilt controlling of an IR filter. FIG. 19 shows a simulation result of a shifted distance with respect to a tilt angle under the condition that the thickness of the IR filter is 0.21 mm and the refractive index of IR is 1.5.

Referring to FIG. 18 and Equation 8 below, the slope ($\theta_1$) of the IR filter 122 and the shifted distance may have the following relationship.

$$\Delta x = d \cos\theta_1 \left( \frac{1}{\tan(90° - \theta_1)} - \frac{1}{\tan(90° - \theta_2)} \right) \quad \text{[Equation 8]}$$

Here, $\theta_2$ can be expressed as in Equation 9.

$$\theta_2 = \sin^{-1}\left( \frac{\sin\theta_1}{n_g} \right) \quad \text{[Equation 9]}$$

In addition, $\theta_1$ is the slope of the IR filter 122, that is, the tilting angle, $n_g$ is the refractive index of the IR filter 122, and d is the thickness of the IR filter 122. For example, referring to Equations 8 to 9, the IR filter 122 may be tilted by about 5 to 6° to shift the image frame input on the image sensor by 7 μm. At this time, the vertical displacement of the IR filter 122 may be about 175 to 210 μm.

In the embodiment of the present invention, the first driving unit 150 may repeatedly shift the optical path of the input light signal according to a predetermined rule. For example, according to the predetermined rule, the first driving unit 150 may shift the optical path of the input light signal by a subpixel unit larger than 0 pixel of the image sensor unit 130 and smaller than 1 pixel in a first direction for a first period, and then, shift by the subpixel unit in a second direction perpendicular to the first direction for a second period, and then, shift by the subpixel unit in a third direction perpendicular to the second direction for a third period, and then, shift by the subpixel unit in a fourth direction perpendicular to the third direction for a fourth period, which process may be repeated. In this specification, the subpixel may mean a unit larger than 0 pixel and smaller than 1 pixel. In the present specification, the shifted degree in each of the first, second, third and fourth directions for each of the first period, the second period, the third period, and the fourth period may be expressed as a subpixel shift value or a shift value. For example, when one pixel includes 4 subpixels of 2*2 and is shifted by one subpixel unit, the shift value may be expressed as 1 subpixel or 0.5 pixel.

In the embodiment of the present invention, the image processing unit 140 may obtain one depth map by reconstructing the first image obtained from the data extracted for the first period, the second image obtained from the data extracted for the second period, the third image obtained from the data extracted for the third period and the fourth image obtained from the data extracted for the fourth period, with super-resolution technique. Here, the first period, the second period, the third period and the fourth period may be commonly used with the first integration time, the second integration time, the third integration time and the fourth integration time, and each of the first image, the second image, the third image and the fourth image may be commonly used with the aforementioned low-resolution subframe and low-resolution image.

To this end, the first driving unit 150 may control the IR filter 122 or the image sensor 130 to be regularly inclined at a predetermined angle with respect to a plane (XY plane) perpendicular to the optical axis (Z).

Referring back to FIGS. 8 to 13, the second driving unit 160 may control the curvature of the liquid lens 126 by using control information for OIS (Optical Image Stabilization). For example, when there is shaking of the camera device 100, the optical path of an incident light signal may be distorted with respect to an optical axis. In this case, the camera device 100 may detect motion information or posture information of the camera device 100 by various sensors (not shown) mounted therein, and extract the control information for OIS by using the detected motion information or posture information. In addition, the second driving unit 160 may control the curvature of the liquid lens 126 by using the control information for OIS, and accordingly, the optical path of the incident light signal may be shifted to be parallel to the optical axis. For example, as shown in FIG. 13, the interface 1100 of the liquid lens 126 may be tilted left or right for OIS.

In this way, when the first driving unit 150 operates for the SR function and the second driving unit 160 operates for the OIS function, the first driving unit 150 may be automatically driven according to a predetermined rule set in advance, and the second driver 160 may be driven according to feedback information or control information.

Meanwhile, in another embodiment of the present invention, the first driving unit 150 may operate for the OIS function, and the second driving unit 160 may operate for the SR function.

That is, the first driving unit 150 may be driven according to the control information for OIS that is extracted from motion information or posture information of the camera device 100, and accordingly, may control to shift the IR filter 122 or the image sensor 130 in a direction perpendicular to the optical axis (Z-axis), that is, in the X-axis and Y-axis directions. In addition, the second driving unit 160 may control the shape or curvature of the interface of the liquid lens 126 to be changed according to a predetermined rule.

As described above, since the camera device according to the embodiment of the present invention can simultaneously perform the SR function and the OIS function, it is possible to obtain the depth map with high resolution and high quality. In particular, since the SR function and the OIS function are performed by separate driving units, each of the SR function and the OIS function can be performed more precisely.

Meanwhile, the camera device 100 according to the embodiment of the present invention may further perform an AF (Autofocusing) function. To this end, the second driving unit 160 may further shift the optical path of an input light signal according to control information for AF. For example, the second driving unit 160 may control the interface of the liquid lens 126 to be convex or concave in the Z-axis direction according to the control information for AF. The function for AF may be performed together with the SR function or the OIS function. For example, when the second driving unit 160 performs the SR function, the second driving unit 160 may control the interface of the liquid lens 126 to be automatically changed according to a predetermined rule, and at the same time, to be further shifted forward or backward in the Z-axis direction according to the control information for AF. In addition, when the second driving unit 160 performs the OIS function, the second driving unit 160 may control the interface of the liquid lens 126 to be tilted along the X-axis and Y-axis directions according to the control information for OIS, and at the same time, to be further shifted forward or backward in the Z-axis direction according to the control information for AF.

Although the embodiments have been described above, these are only examples and do not limit the present invention, and those of ordinary skill in the field to which the present invention belongs will understand that various modifications and applications not illustrated above are possible within the scope not departing from the essential characteristics of the present embodiment. For example, each component specifically shown in the embodiment can be modified and implemented. And differences related to these modifications and applications should be construed as being included in the scope of the present invention defined in the appended claims.

EXPLANATION OF NUMERAL REFERENCES

| | |
|---|---|
| 100: camera device | 110: light output unit |
| 120: lens unit | 130: image sensor |
| 140: image processing unit | |

The invention claimed is:

1. A camera device comprising:
   a light output unit that outputs an output light signal to be irradiated to an object;
   a lens unit that condenses an input light signal reflected from the object;
   an image sensor that generates an electric signal from the input light signal condensed by the lens unit; and
   an image processing unit that extracts a depth information of the object using at least one of a time difference and a phase difference between the output light signal and the input light signal received by the image sensor,
   wherein the lens unit comprises:
      an IR (InfraRed) filter;
      a plurality of solid lenses disposed on the IR filter; and
      a variable lens disposed on the plurality of solid lenses, or disposed between the plurality of solid lenses,
   wherein the camera device further comprises:
      a first driving unit that controls shifting of the IR filter or the image sensor; and
      a second driving unit that controls a shape of the variable lens,
   wherein an optical path of the input light signal is repeatedly shifted according to a predetermined rule by one of the first driving unit and the second driving unit, and
   wherein the optical path of the input light signal is shifted according to predetermined control information by the other one of the first driving unit and the second driving unit.

2. The camera device of claim 1, wherein according to the predetermined rule, the optical path of the input light signal is shifted by a subpixel unit that is greater than 0 pixels and less than 1 pixel of the image sensor in a first direction for a first period, is shifted by the subpixel unit in a second direction perpendicular to the first direction for a second period, is shifted by the subpixel unit in a third direction perpendicular to the second direction for a third period, and is shifted by the subpixel unit in a fourth direction perpendicular to the third direction for a fourth period, and
   wherein the predetermined control information has control information for OIS (Optical Image Stabilization).

3. The camera device of claim 2, wherein the optical path of the input light signal is further shifted according to control information for AF (autofocusing) by the second driving unit.

4. The camera device of claim 2, wherein the control information for OIS is extracted from at least one of motion information and posture information of the camera device.

5. The camera device of claim 2, wherein the optical path of the input light signal is shifted according to the predetermined rule by the first driving unit, and
   the optical path of the input light signal is shifted according to the control information for OIS by the second driving unit.

6. The camera device of claim 5, wherein the first driving unit controls the IR filter or the image sensor to be regularly tilted at a predetermined angle with respect to a plane perpendicular to an optical axis.

7. The camera device of claim 2, wherein the optical path of the input light signal is shifted according to the control information for OIS by the first driving unit, and
   the optical path of the input light signal is shifted according to the predetermined rule by the second driving unit.

8. The camera device of claim 7, wherein the first driving unit controls the IR filter or the image sensor to be shifted in a direction perpendicular to an optical axis.

9. An image processing method of a camera device, comprising the steps of:
   outputting an output light signal to irradiate an object;
   shifting an optical path of an input light signal that is reflected from the object and condensed by a lens unit to reach an image sensor; and
   extracting a depth information of the object using at least one of a time difference and a phase difference between the output light signal and the input light signal received by the image sensor,
   wherein the lens unit includes an IR (Infrared) filter and a variable lens, and
   wherein the step of shifting comprises the steps of:
      repeatedly shifting the optical path of the input light signal according to a predetermined rule via one of moving the IR filter or the image sensor, or controlling a shape of the variable lens; and
      shifting the optical path of the input light signal according to predetermined control information via the other one of moving the IR filter or the image sensor, or controlling the shape of the variable lens.

10. The method of claim 9, wherein the predetermined control information includes control information for OIS (Optical Image Stabilization) extracted from at least one of motion information and posture information of the camera device.

11. The camera device of claim 1, wherein the image processing unit extracts the depth information of the object using a super resolution (SR) technique.

12. The camera device of claim 11, wherein the image processing unit generates a plurality of first resolution subframes, extracts a plurality of first resolution depth information using the plurality of first resolution subframes, and extracts a second resolution depth information which has a higher resolution than the plurality of first resolution depth information using the plurality of first resolution depth.

13. The camera device of claim 12, wherein the optical path of the input light signal corresponding each of the plurality of the first resolution depth information is different from each other.

14. The camera device of claim 1, wherein the image processing unit generates a plurality of first resolution subframes, extracts a plurality of second resolution subframes which have a higher resolution than the plurality of first resolution subframes using the plurality of first resolution subframes, and extracts a second resolution depth information using the plurality of second resolution subframes.

15. The camera device of claim 11, wherein one of the first driving unit and the second driving unit operates for the SR technique, and the other one of the first driving unit and the second driving unit operates for at least one of OIS (optical image stabilization) function and AF (autofocusing) function.

16. The camera device of claim 15, wherein the first driving unit comprises an actuator directly or indirectly connected to at least one of the IR filter and the image sensor.

17. The camera device of claim 16, wherein the actuator comprises at least one of MEMS (Micro Electro Mechanical Systems), VCM (Voice Coil Motor) and a piezoelectric element.

18. The camera device of claim 1, wherein the second driving unit is directly or indirectly connected to the variable lens, and the second driving unit directly applies a voltage to the variable lens or controls a voltage applied to the variable lens.

19. The camera device of claim 1, wherein the light output unit outputs the output light signal by a pulse wave or a continuous wave.

20. The camera device of claim 1, wherein the light output unit comprises a VCSEL (vertical cavity surface emitting laser).

* * * * *